United States Patent [19]

Fadness

[11] 4,266,904

[45] May 12, 1981

[54] ADJUSTABLE LOAD LIFTING SPREADER FRAME

[75] Inventor: Quinten K. Fadness, Boring, Oreg.

[73] Assignee: RayGo, Inc., Minneapolis, Minn.

[21] Appl. No.: 44,006

[22] Filed: May 31, 1979

[51] Int. Cl.³ .............................................. B62D 43/00

[52] U.S. Cl. .................................... 414/460; 212/213; 212/220; 294/67 BC

[58] Field of Search ...................... 212/13, 14, 125, 11; 414/458, 459, 460, 461; 294/67 BC, 67 B, 81 SF

[56] References Cited

U.S. PATENT DOCUMENTS

| | | | |
|---|---|---|---|
| Re. 27,905 | 1/1974 | Whiteman | 414/460 |
| 3,146,903 | 9/1964 | Bjorklund | 414/460 |
| 3,161,309 | 12/1964 | Baudhuin et al. | 414/459 |
| 3,251,496 | 5/1966 | Lamer | 414/459 |
| 3,494,491 | 2/1970 | Sumida | 414/460 |
| 3,520,431 | 7/1970 | Tax | 414/460 |
| 3,982,644 | 9/1976 | Pease | 414/460 |

*Primary Examiner*—Robert J. Spar
*Assistant Examiner*—Kenneth Noland
*Attorney, Agent, or Firm*—Burd, Bartz & Gutenkauf

[57] ABSTRACT

A spreader frame assembly for connecting onto large, elongate loads such as shipping containers and trailer vans for lifting and moving such loads. The assembly includes a trolley mounted on a straddle carrier with a spreader frame supported beneath the trolley. A positioning column descends from the trolley and makes a swivel connection at the middle of the spreader frame, and a pair of load lifting hydraulic cylinders mounted on the trolley connect at widely spaced points with the spreader frame. A rotate cylinder between the spreader frame and positioning column rotates the frame around a vertical axis, a tilt cylinder also between the spreader frame and column tilts the frame around a horizontal axis, and a translating cylinder between the trolley and column pivots the column to translate the spreader frame.

12 Claims, 8 Drawing Figures

ADJUSTABLE LOAD LIFTING SPREADER FRAME

BACKGROUND OF THE INVENTION (a) Field of the Invention

The present invention relates to spreader frames as used in cargo handling equipment such as straddle carriers. Spreader frames are a form of grappling device for making connection with elongated loads typified by standardized, rectangular shaped shipping containers and trailer truck vans. They connect onto such loads at substantially spaced points along their lengths and are used for lifting and supporting the load during short hauls from one site to another.

(b) Description of the Art

Vehicles for lifting and transporting large, box-shaped shipping containers and transporting them for short distances have become specialized. Straddle carriers are one form of this type of equipment, and in general they are characterized by having a central bay defined by two spaced sides and an arch-like structure connecting the sides that bridges over the bay. A straddle carrier is adapted to be driven over a load, such as a container or van, to receive the load within the bay, and there is provided an elongated spreader frame suspended from the arch-like construction that connects onto the load. By raising the spreader frame the load is elevated for transport, or for stacking one container upon another by utilizing the frame as an elevator. In some straddle carriers the bay is sufficiently large so that by turning the spreader frame the load can be shifted in its orientation, and it is consequently desirable to suspend spreader frames in such fashion that they can turn or reorient the load without moving the entire straddle carrier.

Spreader frames are typically adjustable in length to match that of the loads they are to pick up. The loads can then be lifted at their ends, and it is common in the field of containerization to provide receptor portions of standardized twist-lock type connecting members at the upper corners of the loads for engagement with spreader frames. Shipping containers and trailer vans are usually of standard lengths, such as twenty or forty feet, and spreader frames are set to similar lengths to connect with the loads they are to pick up. In working with such long lengths, there is the problem of aligning a spreader frame with the intended load in order to make connection. The connection can either be in the form of twist-locks at the four upper corners of the load, as mentioned, or a spreader frame may be equipped with depending legs with shoes at their lower ends that encircle underneath the load for lifting it along its bottom. Whichever form of connection is made, the spreader frame must be accurately positioned so that a proper connection is made, and so that the container or van will not be damaged. Often the sides of these loads are quite fragile, and the structurally strong points are at the corners where connection is to be made.

It is unsatisfactory to maneuver the entire straddle carrier in order to align the spreader frame with the load, and the art has addressed itself to this problem by providing some controlled degree of longitudinal and lateral movement of the spreader frame with respect to the straddle carrier chassis. For example, in U.S. Pat. No. 3,982,644 a spreader frame is supported by four hoist cables connected to its four corners, and one end of the frame can be shifted either sidewardly, or turned so as to skew the entire frame. This gives some capability for aligning the spreader frame with respect to a load, and in this particular patent hydraulic cylinders are employed that are connected between the spreader frame and vehicle chassis for shifting the frame with respect to the chassis. However, this only provides a limited degree of adjustment of the spreader frame in a horizontal plane, and does not provide any capability of making a substantial movement of the spreader frame or a significant reorienting of the load once it is lifted.

U.S. Pat. No. 3,520,431 discloses a spreader frame with sensing blades hanging downwardly from its sides. When the frame is brought over a load and then lowered for making connection the sensing blades detect misalignment of the frame with the load. Through an electrical circuit a pair of hydraulic cylinders are operated to rotate the frame or shift it sidewardly to obtain alignment in a transverse direction. However, the entire straddle carrier has to be moved to obtain alignment in the longitudinal direction. Also, the shiftable frame has to be suspended from a second vertically movable frame which requires additional structure. Again, as in the preceding patent, there is only a limited amount of available movement of the frame, and it is impractical to make substantial shifts in the position of a load once it is raised.

The art has not provided a suspension for a spreader frame that will give greater mobility for the manipulation of loads, or for swinging the spreader frame through substantial arcs to give greater versatility to straddle carriers with which they may be used.

SUMMARY OF THE INVENTION

The present invention resides in a spreader frame suspension in which the frame is swivelly connected to a vertically adjustable reaction member that is fixed against rotation but free to pivot sidewardly, an extendible operating element connected between the frame and the reaction member for swivelling the frame with respect to the reaction member about a first axis of movement, a second extendible operating element connected between the frame and the reaction member for swivelling the frame with respect to the reaction member about a second axis of movement, a third extendible operating member for pivoting the reaction member, and supporting elements spaced along the frame adapted to raise and lower the frame.

The suspension system of the invention provides a high degree of mobility for a spreader frame without requiring any shifting or movement of the vehicle, or other structure, from which the frame is suspended. Alignment of the frame can then be made with a load that is oriented initially at a substantial variance in position from the frame in either the horizontal or vertical direction. Further, once the load is raised it can be reoriented in its position by swivelling the frame, or translating the frame in any of several directions of movement without any necessity of maneuvering the straddle carrier from which it is suspended. In this manner, a load can, for example, be lifted from a freight car that is positioned in one direction, then rotated through an arc and translated to another position for depositing on a semi-trailer that is positioned in a different direction than the freight car. With this capability the associated straddle carrier, or other structure that suspends the spreader frame, need not be moved in trans-shipping a load from one form of conveyance to another. Furthermore, the spreader frame makes practical a form of straddle carrier spanning a large open area between its ground engaging supports, or which cantilevers a frame outwardly from its supports to also service a working area outside the perimeter of the supports. It then becomes possible to use a straddle carrier as a form of gantry, as well as being a vehicle for transporting a load from one site to another.

In a preferred form, an elongated spreader frame is suspended beneath a trolley that can move back and forth along rails. A vertically adjustable reaction member in the form of a column extends from the trolley downward to a swivel connection with the spreader frame. The column is mounted in the trolley in a restricted manner that restrains it from rotation, but it is free to pivot in the longitudinal direction of the spreader frame. A pair of hydraulic operating cylinders are connected between the column and the spreader frame for swivelling the spreader frame around two axes of movement. The spreader frame is also supported from the trolley near its ends by lifting means that can raise and lower the frame ends with respect to the trolley. The entire frame can then be raised or lowered, or by independent movement of the lifting means the frame can be tilted about a third axis. Thus, the spreader frame can be rotated about any of three principal axes to spatially orient it through a substantial range of positions. Shifting movements which translate the spreader frame are also made possible. One shifting movement is accomplished by connecting a hydraulic cylinder between the column and the trolley to tilt the column and thereby shift the swivel connection at the lower end of the column in the longitudinal direction of the frame. The frame is then translated with a like movement. For a transverse translation of the frame, the trolley is propelled along its rails to move the entire suspension system. Six degrees of movement are available for the spreader frame, three about axes of rotation perpendicular to one another and two that are translatory at right angles to one another. These are in addition to the usual raising and lowering of the frame, which comprises the sixth mode of movement. This gives rise to a highly versatile arrangement in which a spreader frame can be used for not only lifting a load, but also for manipulating the load in its direction of orientation and for transporting it from one position to another within the working area encompassed by the vehicle from which it is suspended.

It is an object of the invention to provide a spreader frame that can be manipulated in several directions of motion in order to make substantial reorientation of its position.

It is another object of the invention to provide a spreader frame that can be pivoted about three principal axes of motion, and also translated in both longitudinal and transverse directions.

It is another object of the invention to provide a spreader frame swivelled at its center by connection to a reaction member against which extendible-retractable operating members can work for swivelling the frame.

It is another object of the invention to provide a spreader frame that can be adjusted in length for connection to shipping containers of different sizes.

It is another object of the invention to provide a spreader frame supported at two separated points on opposite sides of its swiveled center in a manner that the supports permit several degrees of movement of the frame.

The foregoing and other objects and advantages of the invention will appear from the following description. In the description, reference is made to the accompanying drawings which form a part hereof, and in which there is shown by way of illustration and not of limitation a preferred embodiment of the invention. Such embodiment does not represent the full scope of the invention, and reference is made to the claims herein for interpreting the breadth of the invention.

DESCRIPTION OF THE PREFERRED EMBODIMENT

Figure 1:
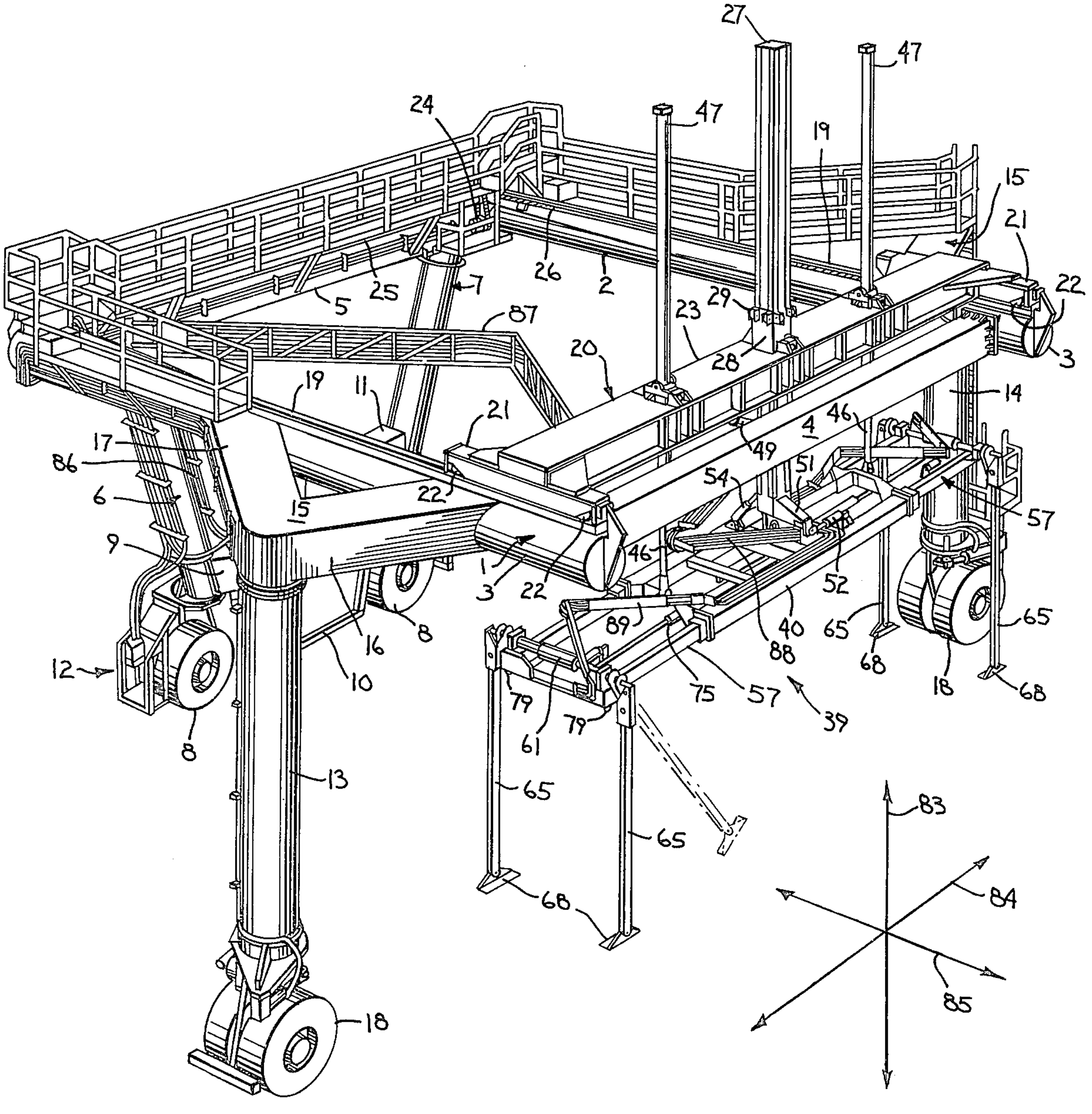
FIG. 1 is a view in perspective of a straddle carrier that incorporates a spreader frame assembly embodying the invention.

FIG. 1 shows in perspective a mobile, tire supported straddle carrier type of vehicle for lifting, transporting and manipulating large loads. The carrier has a rectangular, elevated framework lying in a horizontal plane that includes a pair of spaced side beams 1 and 2 that are at the right and left of the machine, respectively, as one faces in the forward direction of the machine. The forward ends 3 of the side beams 1 and 2 cantilever outward in an overhanging relation to the rest of the machine. A crosswise front beam 4 spans between the front ends 3 of the beams 1 and 2, and a crosswise rear beam 5 extends between the side beams 1 and 2 at their after ends. The four beams comprise a rectangular framework lying in a horizontal plane at a substantially elevation above ground.

There are two upwardly extending right side and left side rear support columns 6 and 7 that are underneath and in supporting relation to the rear crosswise beam 5. The rear support columns 6 and 7 depend downwardly at oblique angles, so that they converge toward one another. In this fashion, the lower ends of the columns 6 and 7 are closer together than the upper ends, and the ground engaging wheels 8 that support the columns 6 and 7 are relatively close together. Extending between the lower ends of the rear support columns 6 and 7 is a carriage 9 and supported by the carriage 9 is a machinery housing 10 and a fuel tank 11.

The wheels 8 are each rotatably mounted for steering the straddle carrier, and at least one of the wheels is power driven. Adjacent the wheel 8 on the right hand side of the straddle carrier is an operator's stand 12 including controls for manipulation of the apparatus. The control stand 12 also houses a radio receiving unit, so that the straddle carrier may be radio operated by a person walking around the machine on the ground as it is operating.

The elevated framework comprising the side beams 1 and 2 and the crosswise beams 4 and 5 is supported near its front by a vertical right-forward column 13 and a vertical left-forward column 14. To connect these forward columns 13, 14 with the elevated framework there is a supplementary framing that juts outwardly from each side beam 1 and 2 in the form of a V-shaped truss 15. Each truss 15 is made up of a box shaped fore member 16 and a box shaped rear member 17 which converge toward one another and join at their outer ends to connect with the upper end of the associated column 13 or 14. The columns 13 and 14 are located sidewardly, or outboard of the elevated framework comprised of the beams 1, 2, 4 and 5, so that the working area under the machine for handling loads is enlarged. Also, the forward columns 13, 14 are set a substantial distance back from the front of the machine, so that the front ends 3 of the side beams 1 and 2 overhang forwardly of the supporting structure afforded by the columns 6, 7, 13 and 14. This provides a work space under the machine that is to the front of the ground area encompassed by the ground supported columns 6, 7, 13 and 14. Secured to the bottom of each front column 13, 14 is a rotatable wheel assembly 18. Each of these wheel assemblies 18 is steerable, similarly as the rear wheels 8, so that the straddle carrier is highly maneuverable, and at least one of the wheel assemblies 18 is power driven for propelling the vehicle.

Secured to and extending along the top of each side beam 1 and 2 is a rail 19. A trolley 20 bridges across and rides upon the rails 19 for travel between a forward position, as shown in FIG. 1, and a rear position alongside the rear crosswise beam 5. The trolley 20 has a rectangular, box shaped truck 21 at each of its ends which overlie the rails 19 and each truck 21 has a pair of wheels 22 located within the truck ends that ride upon the associated rail 19. Extending between the two trolley trucks 21 is a trolley bridge 23 that is essentially a long box-shaped member. To propel the trolley 20 along the rails 19 a drive motor 24 is located in the rear left corner of the elevated framework. A shaft 25 driven by the motor 24 extends alongside the rear crosswise beam 5, and at each end of the drive shaft 25 there is a sprocket which engages a chain 26 extending out along the inner side of the respective side beam 1, 2. This chain is connected at one end to the trolley 20, and by driving the chain back and forth the trolley 20 is propelled along the rails 19. The construction of the straddle carrier and the drive for the trolley is more fully described in the copending application of Clinton B. Clark, Jr., Scott S. Corbett, Jr., and Allen E. VanDuyn entitled "Cantilever Straddle Carrier".

Figure 2:
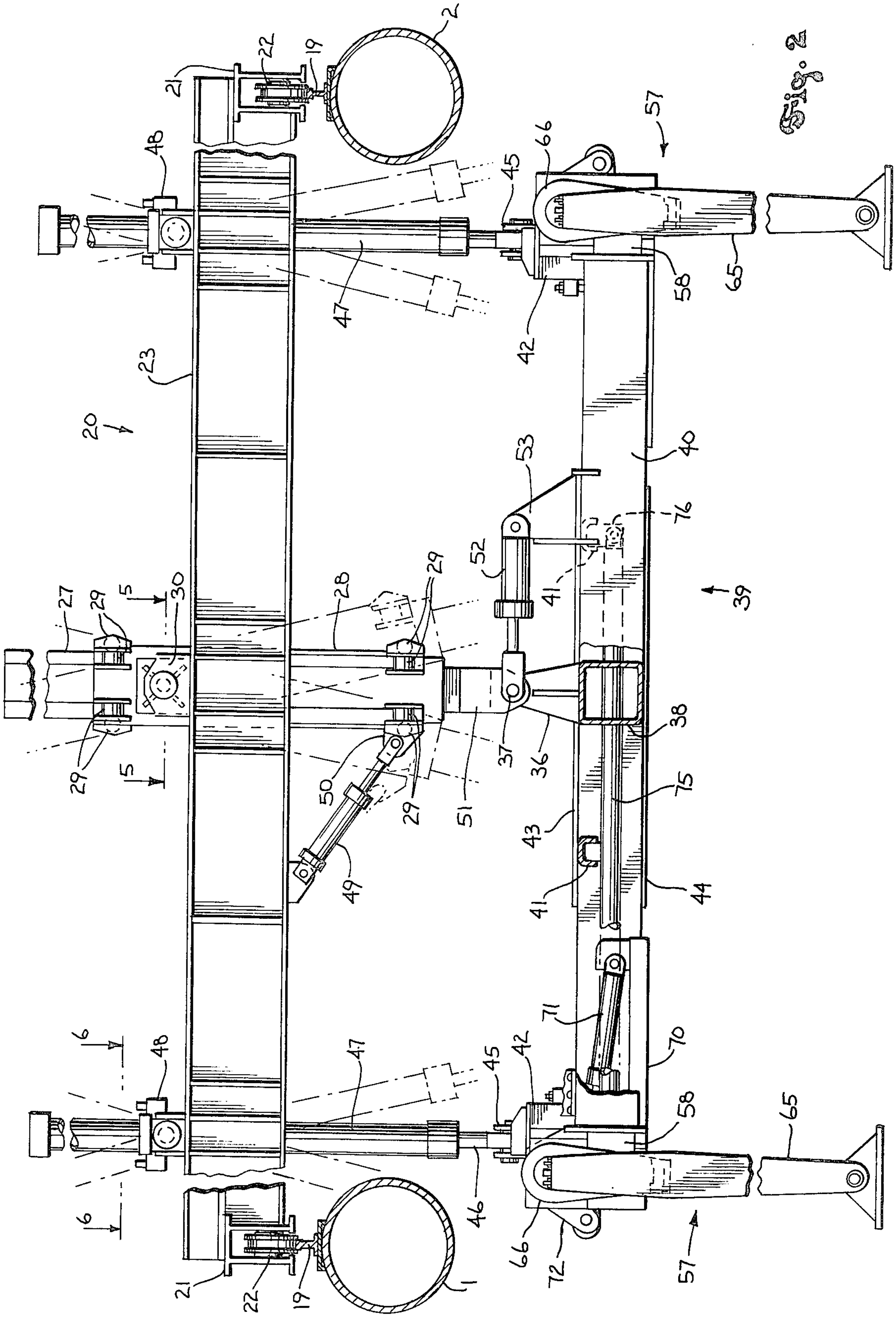
FIG. 2 is a front view of the spreader frame assembly including a trolley from which the frame is suspended.
Figure 5:
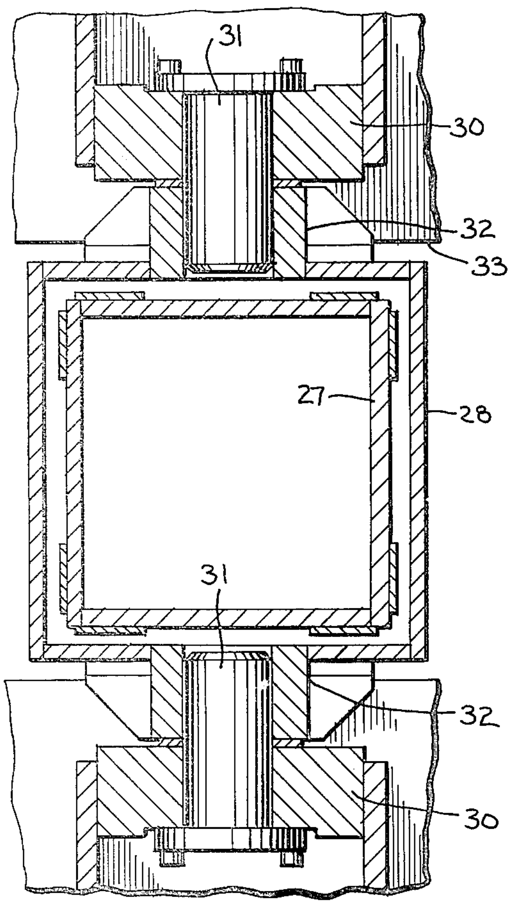
FIG. 5 is a fragmentary view in section of a columnar reaction member of the spreader frame assembly taken in the plane 5—5 indicated in FIG. 2.
Figure 7:
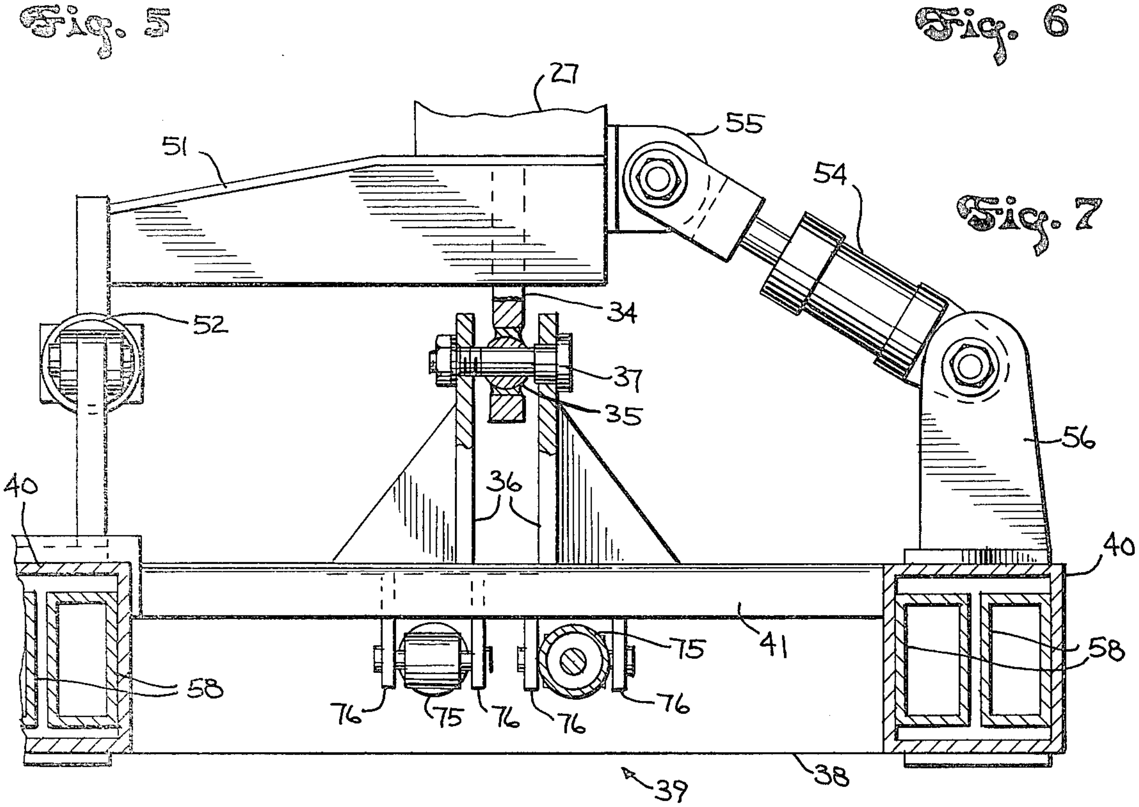
FIG. 7 is a view in section of the spreader frame and its swivel mounting taken in the plane 7—7 indicated in FIG. 3.

As seen in FIGS. 1 and 2, a vertically oriented column 27 is located at the middle of the trolley bridge 23 which projects both above and below the bridge 23. The column 27 is rectangular in cross section and is free to move upwardly and downwardly within a guide sleeve 28 which also projects from both the top and bottom of the trolley bridge 23. As seen in FIG. 5, the guide sleeve 28 closely conforms around the column 27, and as best seen in FIG. 2 the sleeve 28 is provided with a set of column guiding rollers 29 at both its top and bottom. With this arrangement the column 27 can freely move longitudinally in a vertical line, but is restrained from any rotational movement. The guide sleeve 28 is pivotally mounted on the trolley bridge 23 so that it may swing to and fro in the plane of the trolley bridge 23, as indicated by the phantom lines in FIG. 2. As seen in FIGS. 2 and 5, the pivotal mounting for the guide sleeve 28 consists of two vertical blocks 30 secured to the upper side of the trolley bridge 23 from which project a pair of trunnions 31. Bearings 32 secured to opposite sides of the guide sleeve 28 encircle the projecting ends of the trunnions 31, and a central opening 33 in the trolley bridge 23 is large enough to permit a substantial pivot of the column 27 in either sideward direction of the straddle carrier. The column 27 has only a raise-lower motion and a single pivotal movement, and can neither rotate around its axis or pendulate in the fore and aft direction of the straddle carrier, which is transverse to the trolley bridge 23. As seen in FIG. 7, there protrudes from the lower end of the column 27 a downwardly extending plate 34 that has a ball type swivel connection 35 at its lower end. This swivel connection 35 joins with a pair of brackets 36 through a coupling pin 37. The brackets 36 are firmly secured at the top middle of a cross beam 38 of a spreader frame 39.

Figure 3:
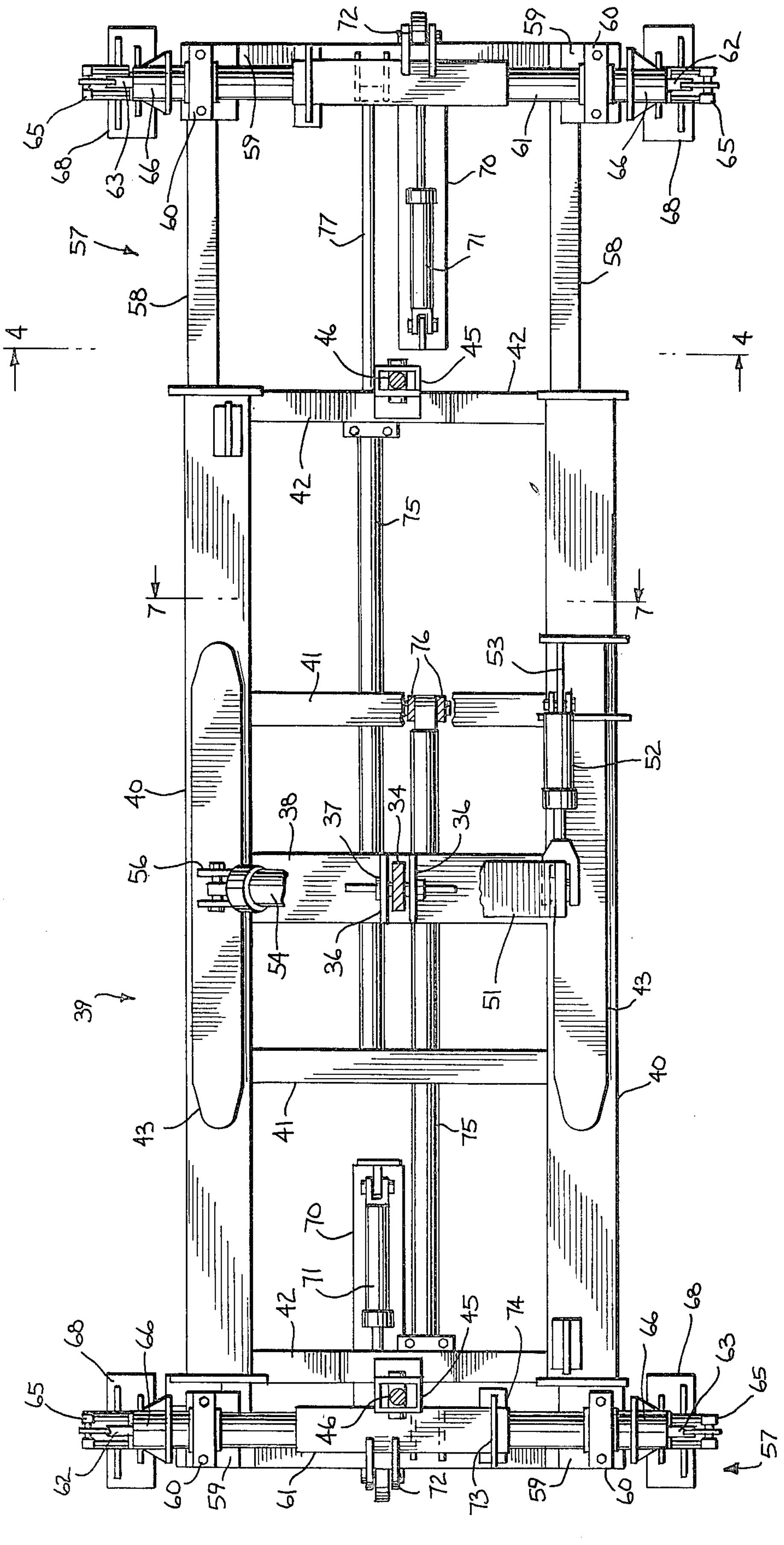
FIG. 3 is a top view of the spreader frame of the invention.

Referring particularly to FIG. 3, the spreader frame 39 has a central portion made up of two transversely spaced side girders 40 that are of box configuration to present hollow cross sections as shown in FIG. 7. The side girders 40 are connected to one another by the cross beam 38 at their midpoints, by a pair of inverted U-shaped ribs 41 spaced endwise from the cross beam 38, and by a pair of end braces 42 extending between the respective ends of the side girders 40. Stengthening plates 43 are welded to the top surfaces of each side girder 40 and bottom strengthening plates 44 are welded along the underside of each side girder 40.

Figure 6:
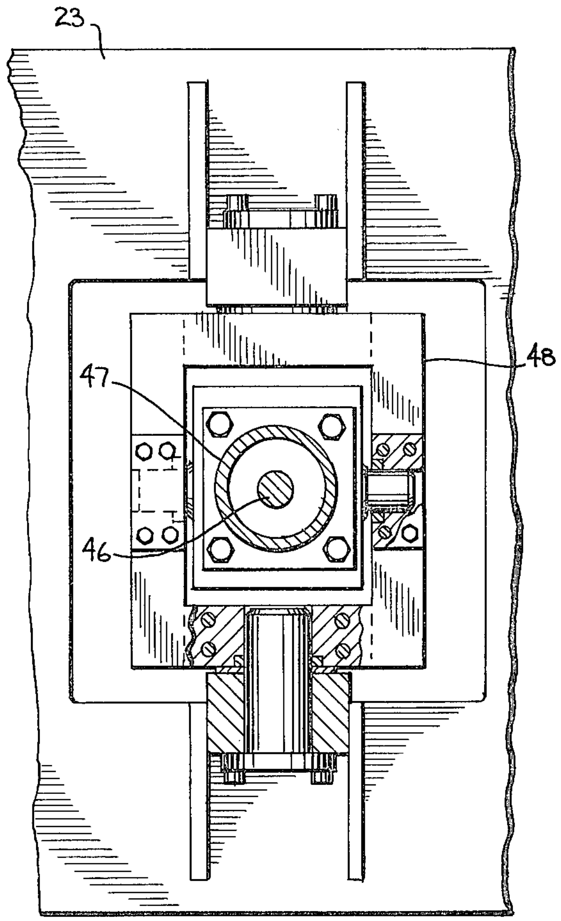
FIG. 6 is a fragmentary view in section of a hydraulic lifting cylinder and its mounting taken in the plane 613 6 indicated in FIG. 2.

Each end brace 42 is arched upwardly at its center, and as shown in FIGS. 2 and 3 there is a lifting bracket 45 welded at the top of each arched region. Each lifting bracket 45 is in pinned engagement with the lower end of a lifting cylinder rod 46 that is a part of a vertically arranged lifting cylinder 47 that extends upwardly through the trolley bridge 23 to emerge from the upper side in parallel relation to the column 27. Each lifting cylinder 47 is mounted to the upper side of the trolley bridge 23 by a gimbals mounting 48 constructed as is shown in FIG. 6. With this arrangement, the casing of each lifting cylinder 47 is fixed vertically with respect to the trolley bridge 23, but is able to swing in any direction. By extending and retracting the rods 46 the spreader frame 39 and any load connected thereto can be raised or lowered. By having the cylinders 47 free to swing in any direction they will follow a pivot of the column 27, as illustrated in phantom in FIG. 2, or they may also pivot transversely of the trolley bridge 23 upon any rotation of the spreader frame 39 around its vertical axis in a manner to be described. Thus, the lifting cylinders 47 function to support the spreader frame 39 and any load attached thereto, but do not interfere with motions imparted to the spreader frame 39 other than the raising and lowering motions.

Referring to FIG. 2, a hydraulic translating cylinder 49 is attached between the underside of the trolley bridge 23 and a bracket 50 extending outwardly from one side of the column 27. Upon extension and retraction of the cylinder 49 the column 27 is caused to pivot on the trunnions 31 in the plane of the trolley bridge 23. This causes an endwise shifting of the spreader frame 39, so that it may be translated longitudinally of its length when oriented in a position paralleling the trolley bridge 23 as shown in the drawings. It is intended that the spreader frame 39 will have a substantial component of its longitudinal length extending in the direction of the trolley bridge 23. To achieve transverse translation of the spreader frame 39 the trolley 20 is propelled along the rails 19 in the forward and rearward direction of the straddle carrier. Thus, the spreader frame 39 can be translated from one position to another while maintaining its direction of orientation.

Referring to FIG. 7, at the bottom of the column 27 there is a rotate arm 51 that projects radially forward from the column 27. The outer end of the rotate arm 51 has a swivel or ball joint connection with the rod end of a horizontally disposed rotate cylinder 52. The blind end of the rotate cylinder 52 has a similar swivel connection with an upstanding bracket 53 rising upwardly from the upper surface of the forward side girder 40. By operation of the hydraulic cylinder 52 the spreader frame 39 can be rotated about the vertical axis of the column 27. The column 27 and its radially extending rotate arm 51 will remain stationary so that movement of the cylinder 52 will cause the bracket 53, and hence the entire spreader frame 39 to rotate in a horizontal plane.

A hydraulic tilt cylinder 54 is also shown in FIG. 7 which is connected at its rod end through a swivel connection to a bracket 55 extending outwardly from the bottom end of the column 27. The cylinder 54 is connected at its blind end through a swivel connection to an upstanding bracket 56 that rises upwardly from the rearward girder 40 of the spreader frame 39. The cylinder 54 is shown in an oblique position, and by extension and retraction of the cylinder 54 it will cause the spreader frame 39 to pivot, or tilt, around its swivelled connection with the lower end of the column 27 along the longitudinal frame axis. The swivel connections of the rotate cylinder 52 and tilt cylinder 54 provide freedom and adjustment in their positions when various motions are imparted to the spreader frame 39 to avoid binding of the parts.

The spreader frame 39 is adjustable in length through the provision of a telescopically extendible end frame 57 at each end of the central frame portion made up of the side girders 40 and cross bracing 41, 42. In FIGS. 1 and 2 the two end frames 57 are shown in fully retracted positions. In FIG. 3 one end frame 57 at the right hand side of the drawing is shown partly extended, while the other frame 57 is fully retracted, and in FIG. 4 a frame 57 is shown from a right position looking from inside the spreader frame 39 outwardly toward a frame end.

Each end frame 57 has a pair of longitudinal, transversely spaced side rails 58 that are telescopically received within the girder 40. Each rail 58 takes up one half the internal cross section area of a girder 40, so that each girder 40 houses a side rail 58 of each end frame 57 and the two side rails 58 can slide past one another when retracted into the girder 40. The outer end of each side rail 58 is attached to a mounting block 59, shown in FIGS. 3 and 4, and on each mounting block 59 is secured a bearing housing 60. Supported between the two bearing housings 60 of an end frame 57 is a horizontal, transversely extending, tubular axle 61. Inside each tubular axle 61 is a floating, hydraulic leg operating cylinder 62 from which a pair of shafts 63, 64 extend concentrically through the axle 61 to emerge at opposite ends. At the outer end of each shaft 63, 64 is pinned the upper end of a grappling leg 65. The grappling legs 65 are shown in their downwardly projecting, vertical positions in the drawings, but they may be rotated about their upper ends to a horizontal position adjacent the side rails 58 and girders 40. In FIG. 1 legs 65 are shown in phantom in partially raised positions.

Figures 4, 8:
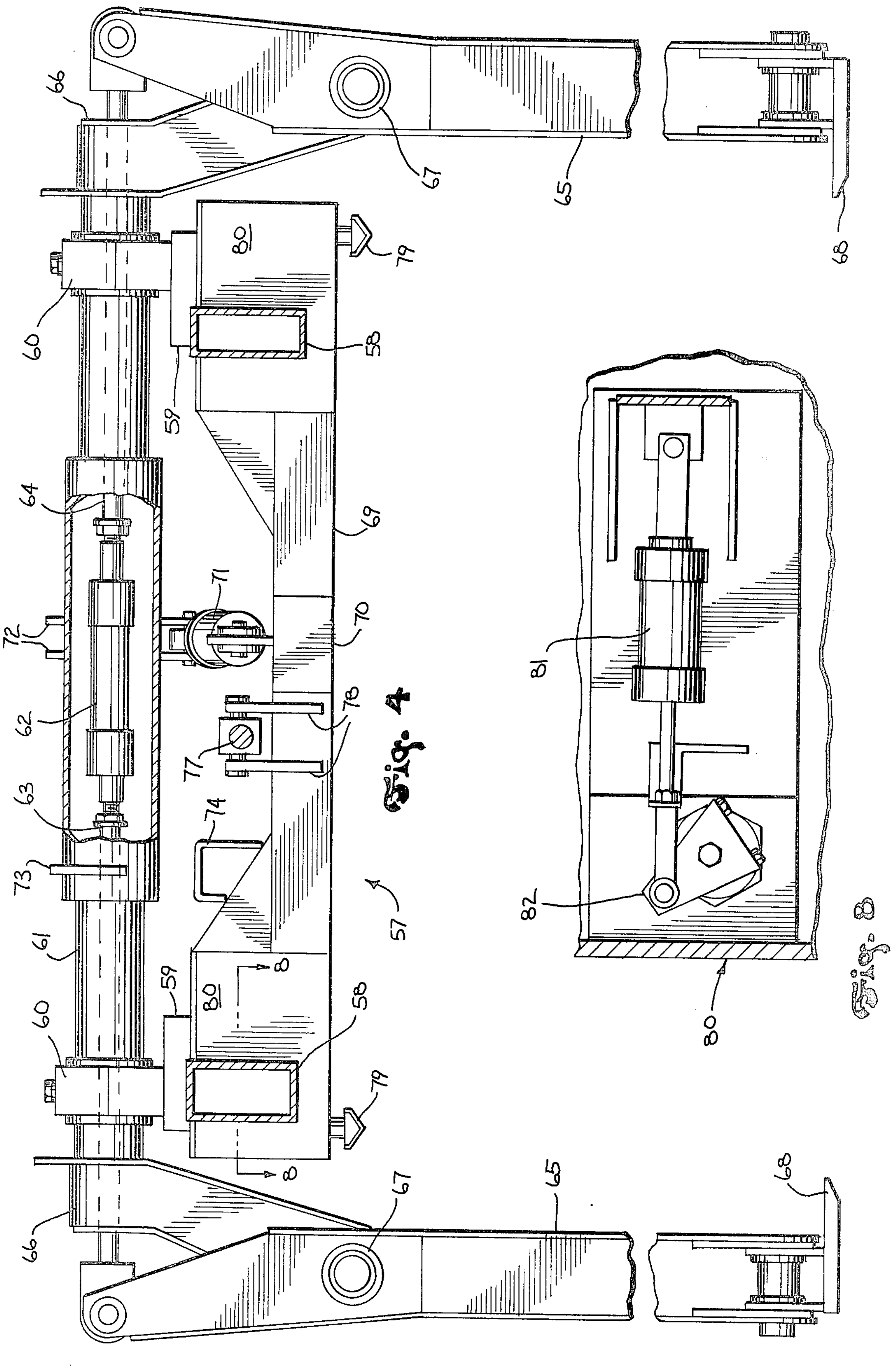
FIG. 4 is a view in section of the spreader frame taken in the plane 4—4 indicated in FIG. 3.
FIG. 8 is a top view of a twist-lock mechanism forming a part of the spreader frame.

Alongside the upper end of each grappling leg 65 is a collar 66 which encircles the associated shaft 63, 64 and is fixed to the outer end of the axle 61. Each collar 66 extends downward, as seen in FIG. 4, to a pinned connection 67 with the associated grappling leg 65. The connections 67 form pivots for the legs 65 about which the legs can move in and out to come alongside containers, or loads, that they are to engage and lift. At the bottom of each leg 65 is an inwardly turned shoe 68 which extends underneath loads to form the supporting elements upon which loads are to rest.

To move the grappling legs 65 in and out about the pivots 67, the hydraulic cylinder 62 is operated to simultaneously extend or retract the shafts 63, 64. Upon a cylinder retraction the shafts 63, 64 are brought inward to swing the legs 65 outward. The legs 65 can then be brought over and downwardly alongside a load, and by an expansion of the cylinder 62 the rods 63, 64 are projected to swing the legs 65 inwardly to come closely alongside the load with the shoes 68 encircling underneath the load.

A crosswise brace 69, which is best shown in FIG. 4, extends between the outer ends of the side rails 58 of each end frame 57. Each brace 69 underlies an axle 61, and firmly fixed to and extending inwardly from each brace 69 is a narrow arm 70. Each arm 70 serves to mount an axle rotating, hydraulic cylinder 71 that has a rod end pinned between a pair of brackets 72 that are attached to and depend from the middle of the associated axle 61. Operation of the cylinder 71 will rotate the axles 61 for the purpose of moving the legs 65 between the downward position shown in the drawings and their horizontal, non-operative position alongside the rails 58 and girders 40. A stop is provided for limiting the rotation of each axle 61 which is in the form of a flange 73 on the axle 61 and a buttress 74 supported from the associated brace 69.

A pair of extension cylinders 75 are mounted in the spreader frame 39, one for each end frame 57. The blind end of each extension cylinder 75 is pinned to a bracket 76 on the underside of a cross rib 41, and the cylinders 75 extend in opposite directions and overlap one another in the central area of the spreader frame 39. The rods 77 of the extension cylinders 75 extend to the cross braces 69, and as shown in FIG. 4 each rod 77 terminates in a small block pinned to a pair of brackets 78 standing up on the associated cross brace 69. Thus, by extension and retraction of the hydraulic cylinders 75 the end frames 57 are telescoped outwardly or inwardly to adjust the length of the spreader frame to match a load that is to be lifted and carried from one place to another.

For connecting onto the upper corners of standardized containers, there is provided at the under corner of each cross brace 69 a downwardly projecting head 79 of a twist-lock mechanism. The controls of each mechanism are within a housing 80 at the end of a brace 69, as shown in FIG. 4. The interior controls are shown in FIG. 8, and they can be of usual construction. An operating cylinder 81 pivots an arm 82 that turns the twist-lock head 79. The spreader frame 39 thus has two means for connecting onto loads. Either the twist-lock mechanism or the grappling legs 65 may be used.

Hydraulic lines for operating the various cylinders of the spreader frame assembly are supplied from the machinery housing 10. As seen in FIG. 1 lines 86 run upwardly alongside the oblique, rear column 6, and these lines are then supported on an articulated framing 87 that joins to the trolley bridge 23. Lines are fed downwardly from the trolley bridge 23 on articulated framing 88 to the spreader frame 39, and additional articulated framing 89 carries hydraulic lines to the end frames 57. The lines and articulated framing are only shown in FIG. 1, and have been deleted from other views for purposes of clarity of the construction of the other elements of the invention.

The spreader frame assembly of the invention enhances the versatility of the straddle carrier, or other type of equipment, with which it is used. By providing a swivel mounting at the middle of the spreader frame, rotation can be had around any of the frame's three principal axes. For the frame 39, for example, rotation around the vertical axis (the line 83 in FIG. 1) is obtained by operation of the rotate cylinder 52, rotation around the longitudinal axis (the line 84 in FIG. 1) is obtained by operation of the tilt cylinder 54, and rotation around the transverse axis (the line 85 in FIG. 1) is obtained by raising one lifting cylinder rod 46 and lowering the other. The spreader frame can also be translated in any of the three principal directions. Operation of the translating cylinder 49 provides a longitudinal translation, movement of the trolley 28 provides transverse translation, and operation of the lifting cylinders 47 provides vertical translation.

In obtaining six degrees of movement for the spreader frame, three of which are rotational and three translatory, one of the unique aspects is the swivelled center connection for the spreader frame 39. It utilizes a vertically adjustable reaction member, which in the embodiment illustrated is the column 27. This column 27 functions as a reaction member against which some of the operating cylinders work, and it also imparts a longitudinal translation to the frame 39. Lifting and support for the frame 39 are derived from the cylinders 47 that connect at longitudinally spread apart points. The use of a pair of spaced lifting elements provides independent control of the two grappling, or load connecting ends of the frame 39.

An embodiment of the invention having been described, reference is made to the following claims for its scope.

I claim:

1. In a spreader frame assembly for handling shipping containers and the like, the combination comprising:
- a supporting member;
- a horizontal spreader frame having load engaging means on its lower side;
- a vertically adjustable reaction member swivelly connected to the upper side of said frame at a position medial of the frame ends which is restrained from rotation;
- means movably mounting the reaction member on the supporting member;
- a rotate cylinder connected between said frame and said reaction member to rotate said frame about a vertically extending axis;
- a tilt cylinder connected between said frame and said reaction member to rotate said frame about a horizontal axis;
- lifting means connected to said frame at positions on opposite sides of said positioning column for raising and lowering the frame ends thereby causing vertical adjustment of said reaction member; and
- translating operating means connected to said supporting member and reaction member for tilting the reaction member to effect a translation of said frame.

2. An apparatus as in claim 1 having an end frame telescopically mounted at each end of said spreader frame; a rotatable axle mounted transversely on each end frame; grappling legs at the ends of said axles; and axle rotating cylinders on the end frames that rotate the axles and their associated legs in unison.

3. An apparatus as in claim 2 having extension cylinders mounted between said spreader frame and said end frames to project and retract said end frames with respect to said spreader frame.

4. An apparatus as in claim 2 having a leg operating cylinder in each axle that is connected to the legs of the axle to move said legs for grappling a load.

5. In a spreader frame assembly for handling shipping containers and the like, the combination comprising:
- a supporting member;
- a frame disposed beneath said supporting member;
- a reaction member depending from said supporting member downwardly to a connection with said frame that is vertically adjustable to accommodate raising and lowering said frame;
- rotate operating means connected between said frame and said reaction member to rotate said frame about a vertically extending axis;
- tilt operating means connected between said frame and said reaction member to rotate said frame about a horizontal axis;
- lifting means depending from said supporting member and connected to said frame at positions on opposite sides of said reaction member; and
- translating operating means connected between said supporting member and said reaction member for tilting the reaction member to effect a translation of said frame.

6. An apparatus as in claim 5 having an end frame telescopically mounted at each end of said frame, a rotatable axle mounted transversely on each end of the frame, grabbling legs at the ends of said axles, and axle rotating cylinders on the end frames that rotate the axles in their associated legs in unison.

7. In a spreader frame assembly for handling shipping containers and the like, the combination comprising:
- an elongate supporting trolley that is movable transversely of itself;
- an elongate spreader frame disposed beneath said trolley that is alignable with said trolley;
- a vertically adjustable position orientating reaction member depending from said trolley downwardly to a swivel connection with said spreader frame;
- a rotate cylinder connected between said spreader frame and said reaction member to rotate said spreader frame about a vertically extending axis;
- a tilt cylinder connected between said spreader frame and said reaction member to rotate said spreader frame about a horizontal axis;
- a translating cylinder connected between said trolley and said reaction member to shift said reaction member and said spreader frame with respect to said trolley; and
- lifting cylinders depending from said trolley and connected to said spreader frame at positions on opposite sides of said swivel connection.

8. An apparatus as in claim 7 in which said reaction member is a column extending downward from said trolley that is held from rotation and pivotal about a horizontal axis.

9. In a spreader frame assembly for handling shipping containers and the like, the combination comprising:

a supporting member;

a central frame disposed beneath said supporting member, said central frame having telescopically mounted end frames that are extendible and retractable with respect thereto;

a position orientating column depending from said supporting member downwardly to a connection with said central frame;

an extendible-retractable rotate operating member connected between said central frame and said positioning column to rotate said central frame about a vertically extending axis;

an extendible-retractable tilt operating member connected between said central frame and said positioning column to rotate said central frame about a horizontal axis;

lifting means depending from said support member and connected to said central frame at positions on opposite sides of said connection with said positioning column; and an extendible-retractable translating member connected between said supporting member and said positioning column to tilt the column and thereby translate said central frame.

10. An apparatus as in claim 9 having extension cylinders mounted between said central frame and said end frames to project and retract said end frames with respect to said central frame.

11. In a spreader assembly for handling shipping containers and the like, the combination comprising:

an overhead carrier bridge;

a horizontally disposed, elongate, rectangular central frame positioned beneath said bridge;

a positioning column carried by said bridge and held from rotation that extends downwardly from the bridge to a universal, swivel connection with said central frame;

a sideward extension on said positioning column that is disposed above said central frame;

a rotate cylinder that extends and retracts in a horizontal direction connected between said central frame and said sideward extension to rotate said central frame about the vertical;

an obliquely positioned tilt cylinder oriented in a plane transverse to said rotate cylinder and connected between said central frame and said positioning column to tilt said central frame about a horizontal line;

a translating cylinder connected between said carrier bridge and said column adapted to pivot said column with respect to said carrier bridge to longitudinally translate said central frame;

a pair of lifting cylinders pivotally mounted on said carrier bridge that extend downward to pivoted connections with said central frame at points on opposite sides of said positioning column;

an extendible end frame projecting from each end of said central frame;

cylinder means carried by said central frame for extending and retracting said end frames; and load engaging means mounted on said end frames.

12. In a spreader assembly for handling shipping containers and the like, the combination comprising:

an overhead carrier;

a horizontally disposed, elongate frame positioned beneath said carrier;

a vertically adjustable reaction member, supported from said carrier and held from rotation that extends downwardly from the carrier to a universal connection with said frame;

a sideward extension on said reaction member that is disposed above said frame;

a rotate operating member that extends and retracts in a horizontal direction connected between said frame and said sideward extension to rotate said frame about the vertical;

an obliquely positioned tilt operating member oriented in a plane transverse to said rotate cylinder and connected between said frame and said reaction member to tilt said frame about a horizontal line;

a translating operating member connected between said carrier and said reaction member adapted to pivot said reaction member with respect to said carrier to longitudinally translate said frame;

a pair of load lifting members pivotally mounted on said carrier that extend downward to pivoted connections with said frame at points on opposite sides of said reaction member; and load engaging means mounted on said frame.

* * * * *

UNITED STATES PATENT AND TRADEMARK OFFICE

CERTIFICATE OF CORRECTION

PATENT NO. : 4,266,904

DATED : May 12, 1981

INVENTOR(S) : Quinten K. Fadness

It is certified that error appears in the above-identified patent and that said Letters Patent are hereby corrected as shown below:

Column 4, line 25, "6136" should be -- 6-6 --.

Column 4, line 48, "substantially" should be -- substantial --.

Signed and Sealed this

*Twenty-fifth* Day of *August 1981*

[SEAL]

*Attest:*

GERALD J. MOSSINGHOFF

*Attesting Officer* *Commissioner of Patents and Trademarks*